(No Model.)
J. S. CHAMBERS, Jr.
RAILWAY GATE.
No. 473,823. Patented Apr. 26, 1892.
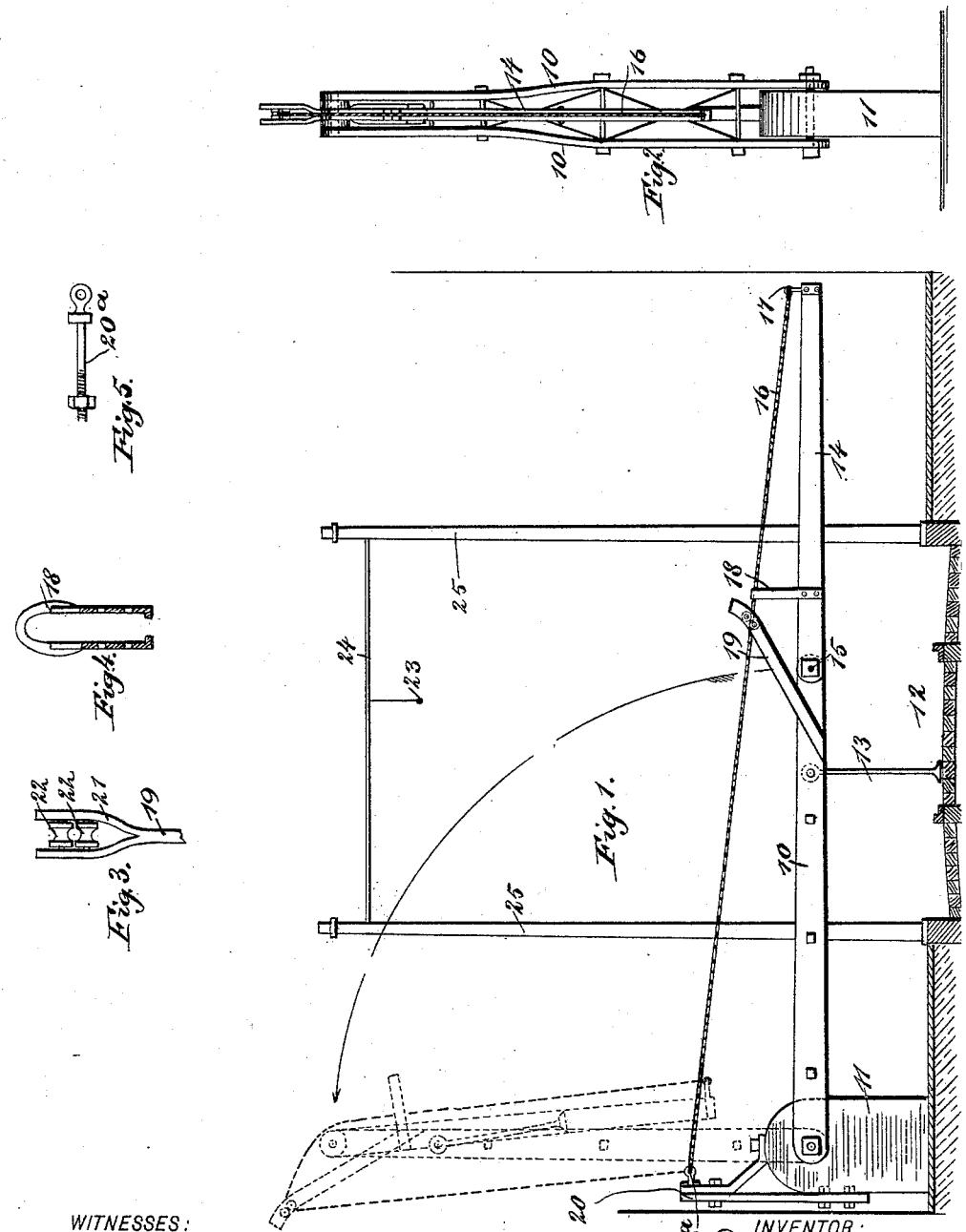
WITNESSES:
F. McArdle
C. Sedgwick
INVENTOR:
J. S. Chambers Jr.
BY Munn & Co.
ATTORNEYS

UNITED STATES PATENT OFFICE.

JOHN S. CHAMBERS, JR., OF ALLEGHENY, PENNSYLVANIA.

RAILWAY-GATE.

SPECIFICATION forming part of Letters Patent No. 473,823, dated April 26, 1892.

Application filed July 1, 1891. Serial No. 398,098. (No model.)

*To all whom it may concern:*

Be it known that I, JOHN S. CHAMBERS, Jr., of Allegheny, in the county of Allegheny and State of Pennsylvania, have invented a new and Improved Railway-Gate, of which the following is a full, clear, and exact description.

My invention relates to improvements in gates, and more especially to that variety of gates which are used to close the approach to railway-crossings.

The object of my invention is to produce a swinging gate which will entirely close the crossing and which when raised will fold, and thus enable the gate to clear overhead electric wires or other obstructions.

To this end my invention consists in a railway-gate constructed substantially as hereinafter described and claimed.

Reference is to be had to the accompanying drawings, forming a part of this specification, in which similar figures of reference indicate corresponding parts in all the views.

Figure 1 is a side elevation of the gate when closed in a horizontal position, its vertical open position being indicated by dotted lines. Fig. 2 is an end view of the gate in a raised position. Fig. 3 is an enlarged detail view of one of the guides for the cable which operates the supplemental arm of the gate. Fig. 4 is a detail view, partly in section, of the guide which is carried by the supplemental arm; and Fig. 5 is a detail view of the eyebolt in the gate-brace.

The main arm 10 of the gate is substantially of the ordinary construction and is hinged at its base to a support 11 in the usual way and is adapted to drop into a horizontal position across a railway-crossing 12. The main arm has a supporting-rod 13 hinged to it, so that when dropped into a horizontal position the rod will rest upon the ground and serve as a brace for the gate. Pivoted on a pin 15 in the free end of the main arm 10 is a supplemental arm 14, and a cable 16 is secured to a ring 17 on the upper side of the supplemental arm near the end, extends through guides 18 and 19, and is secured to an eye-bolt 20ª in a brace 20 on the upper part of the main gate-support 11. The guide 18 is simply an inverted-U-shaped clip, which is secured to the supplemental arm 14 so as to project above the same, and the device will work well if the guide 18 is dispensed with. The guide 19 has a forked upper end, as shown at 21, in which are pivoted grooved rollers 22, and the cable 16 extends between these rollers, which serve to prevent friction.

In the drawings an electric-car cable 23 is shown extending above the track, being supported on a cross-rod 24 and side posts 25, and it will be seen by the curved line in Fig. 1, which marks the course of the free end of the main arm, that when the gate is raised it will clear both the wire and the cross-rod. It will also clear any other obstructions which may be placed above the track.

The operation of the gate is as follows: Any suitable crank mechanism may be used for swinging it, and when the gate is raised the cable 16 is slackened and the supplemental arm 14 drops by gravity into the position indicated by dotted lines in Fig. 1, so that it will not interfere with any of the obstructions above the track. When the gate is dropped, the cable is gradually tightened and it pulls over the lower roller 22 and upon the free end of the supplemental arm 14, so that the arm is made gradually to assume a horizontal position and will finally rest in horizontal alignment with the main arm 10, as indicated in Fig. 1.

It will be readily understood that the supplemental arm 14 and the main arm 10 may be made of any desired length in relation to each other, the length of the arms being varied according to the distance of the obstructions above the track.

Having thus described my invention, I claim as new and desire to secure by Letters Patent—

1. In a railway-gate, the combination, with a pivoted main arm, of a supplemental arm pivoted to the main arm, an inclined guide secured to the main arm and projecting over and beyond the pivot of the said arms, and a cable having one end secured to the free end of the supplemental arm, passed through the said guide, and at its other end secured to the support at the pivoted end of the main arm, substantially as described.

2. In a railway-gate, the combination, with the pivoted main arm 10, of the supplemental arm 14, pivoted to the main arm, the inclined guide 19, secured to the main arm and provided with the friction-rollers 22, the guide 18, secured to the supplemental arm, and the cable 16, having one end secured to the free end of the supplemental arm, passed through
5 the guide 18 between the rollers of the guide 19, and its other end secured to the brace 20 on the support 11, to which the main arm is pivoted, substantially as herein shown and described.

JOHN S. CHAMBERS, JR.

Witnesses:
S. C. WEISHOPF,
GEO. R. BUCHAN.